(No Model.)

C. VAN DER ZEE.
FRUIT BASKET.

No. 520,814. Patented June 5, 1894.

Witnesses.
Charles Selkirk.
A. Selkirk Jr.

Cornelius Van Der Zee,
Inventor.
by Alex. Selkirk
Attorney.

UNITED STATES PATENT OFFICE.

CORNELIUS VAN DERZEE, OF ALBANY, NEW YORK, ASSIGNOR OF TWO-THIRDS TO DAVID H. MATHIAS AND JAMES H. SIMONSON, OF SAME PLACE.

FRUIT-BASKET.

SPECIFICATION forming part of Letters Patent No. 520,814, dated June 5, 1894.

Application filed September 2, 1893. Serial No. 484,639. (No model.)

*To all whom it may concern:*

Be it known that I, CORNELIUS VAN DERZEE, a citizen of the United States, residing at Albany, in the county of Albany and State of New York, have invented certain new and useful Improvements in Fruit-Baskets and their Covers; and I do hereby declare the following to be a full, clear, and exact description of the invention, such as will enable others skilled in the art to which it appertains to make and use the same.

My invention relates to fruit baskets and their covers, and consists of the combination of parts and devices hereinafter described and set forth in the claims.

The objects of my invention, are to provide a cheap basket and a cover for the same which may be cheaply made, and will be securely held from shifting on the upper end of the basket, and be securely held with the same by elastic cover locking devices which may be readily operated to lock the cover with the basket, or unlock it from the same as may be desired. I attain these objects by the means illustrated in the accompanying drawings forming a part of this specification, in which—

Figure 1:
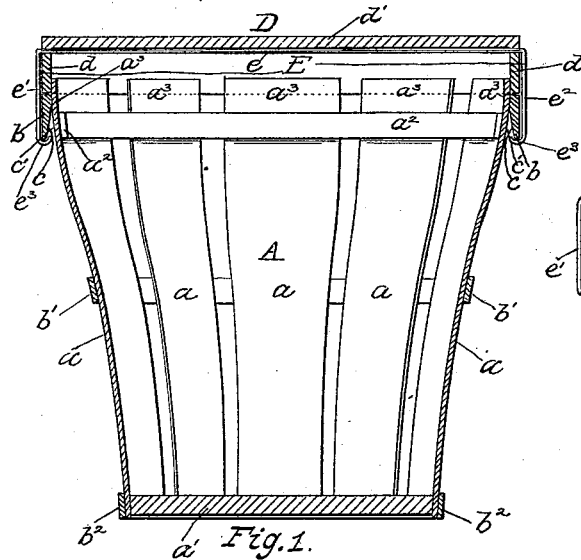
Figure 2:
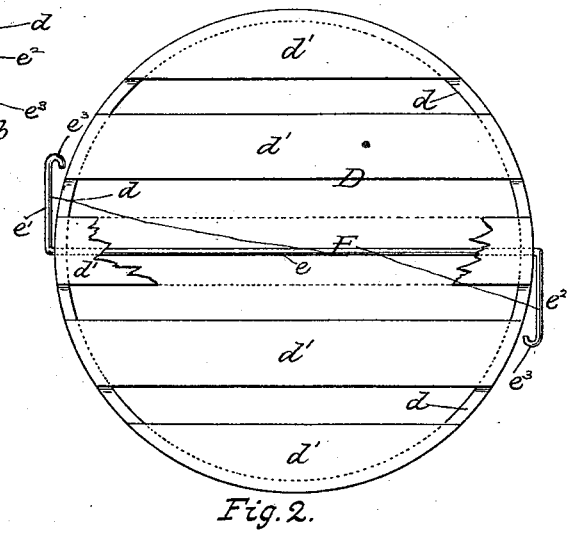
Figure 3:
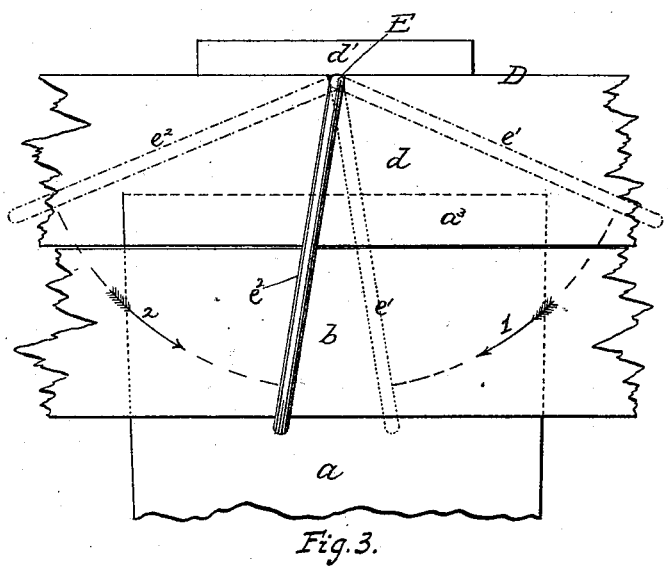
Figure 4:
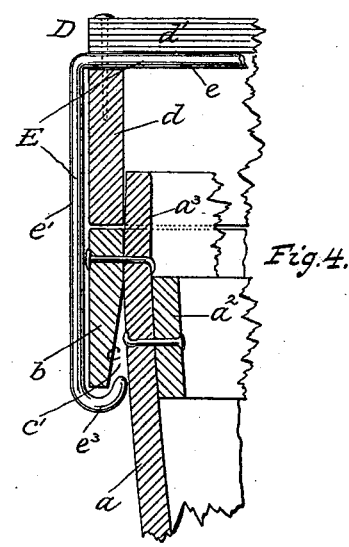

Figure 1 is a sectional view of a basket, and with a cover in place thereon and illustrating the improvements in my invention. Fig. 2 is a plan view of the cover and locking device. Fig. 3 is a side view, on an enlarged scale, of a section of a basket with a cover in place, and the locking device for holding the latter secure with the former; and Fig. 4 is a section, on an enlarged scale, of the same.

The same letters of reference refer to like parts throughout the several views.

In the drawings A represents a fruit basket which may be of any preferred form and size, and preferably made of staves $a\, a$ secured together by hoops $b\, b'\, b^2$, and bottom $a'$. The upper ends of the staves $a\, a$ are extended above the upper hoop $b$ to the distance of from one quarter to one half of an inch, more or less, as may be preferred, and are held from being forced inward by the inner hoop $a^2$ secured by suitable nails with the said staves $a\, a$. The hoops $b\, b'\, b^2$ are also secured to the staves $a\, a$ by suitable nails as practiced by the trade. The upper hoop $b$ is made on its inner side with an outwardly and downwardly flaring surface $c$ which forms, with the staves $a$, an angular form of opening $c'$ between the lower half portion of the hoop and the said staves, as shown in Figs. 1 and 4, which opening $c'$ is intended to receive the holding end of any suitable catching device which may be employed for securing the cover to the basket.

D is the cover which comprises the circular or ring form rim $d$, and the horizontal top strips $d'\, d'$ secured to the former by any suitable means, and preferably by nails. The rim, $d$ is preferably made from strips of wood of width of about one and one quarter inches thickness, and bent in a circular form with the ends of the strip secured together by gluing or by nails as may be preferred. This circular rim is made with an inside diameter preferably a little larger than the outside diameter of the circle of the upwardly projected portions $a^3$, of the staves $a\, a$, so as to be readily passed over the same down to the upper hoop $b$ when the cover is in place, so as to rest on the upper edge of the same, and be prevented from shifting laterally, by the said upper ends of the staves holding with the rim $d$ of the cover from its inner side. This cover D may be secured with the basket A by means of any suitable catching devices, which may be secured to the cover, and be locked at will with the outwardly flared lower edge of the hoop $b$; yet I prefer to employ the locking device E, made of a single piece of wire and comprising the straight middle portion $e$, made with a length about equal to the outside diameter of the cover D, and the arms $e'\, e^2$ formed integral with the portion $e$, and bent at an angle with the same, and provided each with a holding finger $e^3$, for engagement with the lower edge of the hoop $b$, as shown in Figs. 1, 2, and 4. This locking device, comprising said portions $e\, e'\, e^2$ and the holding fingers $e^3\, e^3$, is secured to the cover D, by placing the straight portion $e$ of the same, across the cover rim $d$ with the arms $e'\, e^2$ outside the same, as shown in Figs. 1, 2 and 3, so that the said arms will be in position indicated by broken and dotted lines $e'\, e^2$, when in their normal situation in relation to the cover, before it is placed on the upper end of the basket. In these situations the cover may be readily removed from the basket, and replaced on the same. When it is desired to secure the cover to the basket by means of the above described locking device E, the operator will turn one of the arms, as $e'$, indicated by broken and dotted lines in direction of arrow 1, Fig. 3, to the situation of dotted lines $e'$, when a twisting of the straight middle portion $e$ of this locking device E will be effected while its finger $e^3$ is engaging with the lower side edge of the upper hoop $b$, so as to hold with the same; the operator will then move the cover down to its place on the upper side edge of the hoop $b$, and then while the finger $e^3$ of the arm $e'$ is in engagement with the lower edge of said hoop $b$, he will move the arm $e^2$ indicated by broken and dotted lines in Fig. 3, in direction of arrow 2, to the situation shown by full lines when its catching finger $e^3$ will be brought into engagement with the lower side edge of the hoop $b$, at the same time as catching finger $e^3$ of arm $e'$ is in engagement with the opposite side lower edge of the said hoop, as shown in Fig. 1.

This basket by its stave ends projecting above the hoop $b$ holds the cover from shifting in any direction, while the hoop $b$ prevents the cover from being crowded down on the top of the fruit, when heaped up.

The cover comprising the hoop form rim and the top slats, may be more cheaply produced than can covers of square or polygonous form, and will be much stronger and not be liable to shift laterally when the rim encircles the upwardly projected staves of the basket. The locking device E, being formed of a single piece of wire as described, may be cheaply produced and secured in place between the upper edge of the rim of the cover and the middle slat of the same, and be at all times ready for locking the cover with the basket, when placed on the upper hoop of the basket, and also be readily unlocked at will, for removal of the cover.

Having described my invention, what I claim is—

1. In a fruit basket, the combination with the staves $a$ $a$ of the basket, of the upper hoop secured to the staves at a short distance below the upper end of the staves, with its lower portion of inner side flaring outwardly and downwardly, and producing, between the lower portion of the hoop and the staves, an opening all around, substantially as and for the purposes set forth.

2. In a fruit basket, the combination with the basket having the upper ends of its staves projected above the upper hoop $b$, and the hoop $b$ provided in its inner side with the outwardly and downwardly inclined surface, and a cover having its rim seated on the hoop $b$ and outside the staves of the basket, of the locking device E, made of a single piece of wire, and comprising the straight middle portion $e$, arms $e'$ $e^2$ and catches $e^3$ $e^3$, substantially as and for the purposes set forth.

In testimony that I claim the invention above set forth I affix my signature in presence of two witnesses.

CORNELIUS VAN DERZEE.

Witnesses:
   ALEX. SELKIRK,
   A. SELKIRK, Jr.